United States Patent Office 3,028,308
Patented Apr. 3, 1962

3,028,308
DRY PHARMACEUTICAL VEHICLE OF COPOLY-
MER OF HYDROLYZED GELATIN AND GLY-
OXAL, AND ITS PRODUCTION
Arthur J. Zambito, Rahway, N.J., and Thomas J. Macek,
Glenside, Pa., assignors to Merck & Co., Inc., Rahway,
N.J., a corporation of New Jersey
No Drawing. Filed Oct. 1, 1959, Ser. No. 843,631
16 Claims. (Cl. 167—82)

This invention relates to a pharmaceutical vehicle, to a method of preparing the same, and to solid preparations containing said vehicle. More particularly, it is concerned with a solid pharmaceutical vehicle which when administered orally together with a medicament maintains continuously a therepeutically effective level of the medicament in the body over an extended period of time.

Medicament compositions having enteric properties have heretofore been made. In general, such compositions normally utilize a vehicle which will not dissolve in the acid juices of the stomach, but which will readily dissolve in the alkaline fluid of the intestine. Thus, while the release of the medicament is prevented in the stomach, the medicament is rapidly released in the intestine. However, in the administration of many medicaments it is often more desirable to control the rate of release of the medicament in the gastro-intestinal tract, including the stomach, so that a continuously effective level of the medicament can be maintained in the body over an extended period of time, for example, 6 hours or more.

Accordingly, numerous efforts have heretofore been made to find a vehicle which in addition to being suitable for oral administration together with the medicament would also effectively control the rate of release of the medicament in the gastro-intestinal tract so as to prolong the duration of a continuously effective level of the medicament in the body. However, for the most part, the vehicles that have been suggested or used to date are unsatisfactory for various reasons. For example, certain of the vehicles suggested are unsatisfactory because they are so rapidly absorbed in the body that controlled release of the medicament in the gastro-intestinal tract for any appreciable time is impossible to achieve. Numerous others are unsatisfactory because they are not sufficiently resistant to attack by the body fluids. Consequently, such vehicles tend to disintegrate fairly rapidly in the body with the result that controlled release of the medicament in the gastro-intestinal tract is not obtained for a sufficient period of time. Still others are unsatisfactory because they are incapable of controlling the rate of release to a sufficient degree.

It is obvious then, that a pharmaceutically and medically acceptable vehicle which is suitable for oral administration together with the medicament and capable of controlling the rate of release of the medicament in the gastro-intestinal tract so that a continuously effective level of the medicament can be maintained in the body over an extended period of time, for example, 6 hours or more is highly desirable and much needed by the medical profession.

According to the present invention, it has been found that continuously effective therapeutic levels of medicaments can be maintained in the body over extended periods of time by incorporating the medicament in a solid, edible, pharmaceutically and medically acceptable vehicle comprising a copolymer of glyoxal and partially degraded gelatin and compressing the resulting mixture into a form of suitable hardness. The copolymer is a chemically modified form of gelatin which when compressed into a tablet or other forms of suitable hardness is highly resistant to disintegration in the gastro-intestinal tract and only slowly decomposed therein by the digestive fluids. At the same time, however, the copolymer possesses the gelling and swelling properties of gelatin and is thus capable of serving as a suitable matrix from which the medicament can diffuse out slowly when in contact with the gastric and intestinal fluids of the body independent of pH and temperature.

These properties of the copolymer are attributable in part to the fact that at least a portion of the copolymer is in such a form that it becomes soft and sticky in the presence of water causing the copolymer to adhere to itself even though swelling may occur.

The cohesive nature of the copolymer appears to be related, in part, to the amount of water-extractable copolymer present in the glyoxalated degraded gelatin. In general, it has been found that glyoxalated degraded gelatin copolymers having a water soluble fraction of from about 30% to about 80% are satisfactory. However, copolymers having a water soluble fraction of from about 40% to about 70% are preferred for optimum results.

The products of the present invention are prepared by first dissolving gelatin in water with warming if necessary to facilitate the solubilization of the gelatin. In general, the concentration of gelatin used may vary over a wide range. Solutions containing up to about 20% (w./w.) are quite satisfactory. Solutions containing higher concentrations may be used but some difficulty may be encountered with such solutions because of their high viscosity and tendency to gel. The pH of the gelatin solution is then preferably adjusted to about 4 (although solutions having a pH in the range of from about 2 to about 7 are satisfactory) by the addition of hydrochloric acid or the equivalent and the solution hydrolyzed at elevated temperatures, that is, from about 95° C. to about 125° C. until the solution has a viscosity of from about 8 to about 16 and preferably from about 10 to about 14 centipoises measured at 50° C. (Brookfield Viscometer). The heating time required will, of course, vary depending on the concentration of gelatin, the pH and temperature employed. With a 20% gelatin solution having a pH of about 4, satisfactory results are obtained after about 0.25 hours at 120° C. while a similar solution having a pH of about 2 will require about 0.5 hour at 95° C.

Alternately, if desired, the degradation may be accomplished by autoclaving the solution at a temperature and pressure of about 120° C. and 15 p.s.i.g., respectively.

The solution of partially degraded gelatin is then neutralized by the addition of sodium hydroxide or the equivalent to provide a pH of about 7.5. Glyoxal is then added and the mixture polymerized. In general, the polymerization is carried out with constant stirring at temperatures of from about 40° C. to 50° C. for from about 10 to about 60 minutes depending on the concentration of glyoxal used. However, it should be noted that although the above temperature range is preferred, materially higher and lower temperatures may be employed, providing that the reaction time is adjusted accordingly. Thus, for example, when higher temperatures are employed a shorter reaction time is necessary while at lower temperatures the reverse is true.

After allowing the reaction to proceed for a sufficient period of time, the solution is dried by suitably known methods thereby forming the solid degraded gelatin-glyoxal copolymer. Suitable drying methods for this purpose include, for example, spray drying, freeze drying, vacuum drum drying and the like. However, for convenience and economy the vacuum drum drying method is preferred.

Either of the two fundamental types of gelatin, type A or type B, having a gel strength ranging from 90 to 300

Bloom and preferably from 200 to 250 Bloom can be employed in preparing the partially degraded gelatin. Type A gelatin is made from acid-conditioned collagen and type B from lime-conditioned collagen. For the most part, gelatin from acid-conditioned stock (type A) is made from frozen porkskins and limed gelatin (type B), from calfskins, beefhides and also from demineralized cattle bones (Ossein). Gelatin made from 100% porkskins (type A gelatin) and having a gel strength of approximately 225 Bloom is especially satisfactory. The gel strength of gelatin is determined by making up a gelatin gel under standard conditions (6⅔% concentration chilled for 17 hours at 10° C.) and testing by means of the Bloom gelometer which is a type of penetrometer. The Bloom value is the number of grams required to force a ½ inch plummet 4 millimeters into the gel. The Bloom value is roughly proportional to the molecular weight and also the viscosity.

The concentration of glyoxal used to prepare the products of the present invention varies depending on the concentration of gelatin used. In general, the concentration of glyoxal used may vary from about 0.025 gram to about 0.07 gram per gram of gelatin. However, concentrations of glyoxal in the range of from 0.04 gram to 0.05 gram per gram of gelatin are preferred.

As previously indicated herein the products of this invention are highly useful as pharmaceutical vehicles for prolonging the duration of continuously effective therapeutic levels of medicaments administered therewith over extended periods of time. In general, any solid medicament or liquid medicament which can be converted to a therapeutically effective solid form can be satisfactorily used. Thus, for example, the medicament may be an antibiotic, such as, for example, penicillin, streptomycin, dihydrostreptomycin, tetracycline, chlortetracycline, oxytetracycline; a hormone, such as, for example, cortisone, hydrocortisone, prednisone, prednisolone, testosterone, progesterone, dexomethasone; a sympathomimetic agent, such as, for example, amphetamine sulfate, dextroamphetamine sulfate, racemic or d-desoxyephedrine hydrochloride; an antihistamine, such as, for example, chloroprophenpyridamine maleate, pyrilamine maleate, pyribenzamine; a barbiturate, such as, for example, phenobarbital, barbital, amobarbital; an antispasmodic agent, such as, for example, atropine, hyoscyamine; a diuretic, such as, for example, chlorothiazide, dihydrochlorothiazide; a sulfonamide, such as, for example, sulfamethazine, sulfamerazine, sulfadiazine, sulfamethylthiadiazole; a tranquilizer, such as, for example, chloropromazine, meprobamate; a vitamin, such as, for example, nicotinic acid, etc.

Solid pharmaceutical preparations containing both the desired medicament and vehicle may be readily formulated in various ways by the use of conventional formulating techniques. Preferably, the medicament and vehicle are intimately admixed and compressed into tablets having a hardness of at least 10 kg. (Monsanto Hardness Tester). However, other solid preparations, such as, for example, pills, pellets and the like having equivalent physical properties are also satisfactory. These latter preparations may be used as is or, if desired, enclosed in conventional gelatin capsules. In the preparation of tablets, for example, the following general method is employed. The dry vehicle is milled to a particle size of about 80 mesh or finer. The desired amount of the selected medicament is then intimately admixed with the powdered vehicle. Preferably an amount of the vehicle is used to provide tablets which contain at least 50% by weight vehicle. Conventional binders such as ethyl cellulose, methyl cellulose, acacia, starch and the like and lubricants such as calcium stearate, magnesium stearate, mineral oil, carbowax and the like may also be added if desired. The resulting mixture is then compressed into tablets having a hardness of at least 10 kg. (Monsanto Hardness Tester) by conventional methods.

The following examples are more specifically illustrative of this invention.

Example 1

1,800 milliliters of distilled water was heated to about 50° C. While agitating, 200 grams of U.S.P. (type A, 225 Bloom) gelatin was added and the pH of the resulting solution adjusted to about 4.0 with concentrated hydrochloric acid. The solution was then heated to 110° C. and maintained at this temperature for 2 hours. The partially degraded gelatin solution, having a viscosity at 50° C. of about 10 to 14 centipoises, was then cooled to 50° C. and the pH of the solution adjusted to about 7.5 with 30% sodium hydroxide. While mixing the solution at 50° C., 33.3 milliliters of an aqueous solution containing 30% (w./w.) glyoxal was added and the reaction allowed to proceed for 10 minutes. The substantially dry, solid, glyoxal-degraded gelatin copolymer was then obtained by vacuum drum drying the solution. The vacuum drum drier was operated at a drum speed of 2 r.p.m. and vacuum maintained at 27 inches mercury. The drum steam pressure was 20 p.s.i.g. The copolymer was then milled to a particle size of about 80 mesh.

Example 2

250 mg. of the powdered copolymer prepared according to the process of Example 1 and 250 mg. of procaine penicillin were mixed dry and compressed into a tablet having a hardness of approximately 14 kg. (Monsanto). The tablet was then exposed, at 37° C., first to a measured amount of synthetic gastric juice for 2 hours and then to a measured amount of synthetic intestinal juice for the remainder of the experiment. The fluids were renewed hourly, at which time an analytical sample was removed and assayed for penicillin content. It was found that the medicament persisted in the fluids over a period of 7 hours.

Example 3

Tablets having the following composition were made:

| | Per tablet, mg. |
|---|---|
| Dihydrochlorothiazide | 51.5 |
| Copolymer (prepared according to the process of Example 1) | 185.5 |
| Methocel HG–60 (400 cps.) | 4.0 |
| Talc with 5% magnesium stearate | 9.0 |
| | 250.0 |

The dihydrochlorothiazide and copolymer were intimately admixed. The resulting mixture was then granulated with an alcoholic (90%) solution of methocel HG–60. Additional anhydrous ethanol was added to complete the granulation. The granules were air-dried at room temperature, then dried at 110° F. for 4 hours and sieved through a #20 mesh screen. The resulting product was then mixed with the lubricant and compressed into tablets having a hardness of approximately 14 kg. (Monsanto).

When the tablets were exposed to synthetic gastric and intestinal fluids as described in Example 2, it was found that the medicament persisted in the fluids over a period of at least 8 hours.

Example 4

50 mg. of dihydrochlorothiazide sodium (as acid), 50 mg. mannitol and 300 mg. of the copolymer prepared according to the process of Example 1 were mixed dry and compressed into a tablet having a hardness of about 13 kg. (Monsanto).

When the tablets were exposed to synthetic gastric and intestinal fluids as described in Example 2, it was found that the medicament persisted in the fluids over a period of at least 8 hours.

Example 5

Tablets having the following composition were made:

| | Per tablet, mg. |
|---|---|
| Dexamethasone phosphate, disodium salt [1] | 30.6 |
| Copolymer (prepared according to the process of Example 1) | 206.4 |
| Methocel HG–60 (400 cps.) | 4.0 |
| Talc with 5% magnesium stearate | 9.0 |
| | 250.0 |

[1] Equivalent to about 25 mg. dexamethasone phosphoric acid.

The dexamethasone phosphate, disodium salt and copolymer were intimately admixed. The resulting mixture was then granulated with an alcoholic (90%) solution of methocel HG–60. Additional anhydrous ethanol was added to complete the granulation. The granules were air-dried at room temperature, then dried at 110° F. for 4 hours and sieved through a #20 mesh screen. The resulting product was then mixed with the lubricant and compressed into tablets having a hardness of approximately 10 kg. (Monsanto).

When the tablets were exposed to synthetic gastric and intestinal fluids as described in Example 2, it was found that the medicament persisted in the fluids over a period of 8 hours.

Example 6

Tablets having the following composition were made:

| | Per tablet, mg. |
|---|---|
| Dexamethasone | 0.75 |
| Copolymer (prepared according to the process of Example 1) | 236.25 |
| Methocel HG–60 (400 cps.) | 4.0 |
| Talc with 5% magnesium stearate | 9.0 |
| | 250.0 |

The dexamethasone and copolymer were intimately admixed. The resulting mixture was then granulated with an alcoholic (90%) solution of methocel HG–60. Additional anhydrous ethanol was added to complete the granulation. The granules were air-dried at room temperature, then dried at 110° F. for 4 hours and sieved through a #20 mesh screen. The resulting product was then mixed with the lubricant and compressed into tablets having a hardness of approximately 10 kg. (Monsanto).

When the tablets were exposed to synthetic gastric and intestinal fluids as described in Example 2, it was found that the medicament persisted in the fluids over a period of at least 8 hours.

Example 7

25 mg. sodium salicylate and 475 mg. of the copolymer prepared according to the process of Example 1 were mixed dry and compressed into a tablet having a hardness of about 14 kg. (Monsanto)

When the tablets were exposed to synthetic gastric and intestinal fluids as described in Example 2, it was found that the medicament persisted in the fluids over a period of at least 7 hours.

Example 8

50 mg. nicotinic acid and 500 mg. of the copolymer prepared according to the process of Example 1 were mixed dry and compressed into a tablet having a hardness of about 14 kg. (Monsanto).

When the tablets were exposed to synthetic gastric and intestinal fluids as described in Example 2, it was found that the medicament persisted in the fluids over a period of at least 12 hours.

Various changes and modifications of the invention can be made, and to the extent that such variations incorporate the spirit of the instant invention, they are intended to be included within the scope of the appended claims.

What is claimed is:

1. A substantially dry pharmaceutical vehicle suitable for oral administration comprising a copolymer of hydrolyzed gelatin and glyoxal containing from about 2.5 to about 7% by weight glyoxal based on the weight of the gelatin.

2. A substantially dry pharmaceutical vehicle suitable for oral administration comprising a copolymer of hydrolyzed gelatin and glyoxal containing from about 4 to about 5% by weight glyoxal based on the weight of the gelatin.

3. A substantially dry pharmaceutical vehicle suitable for oral administration comprising a copolymer of hydrolyzed gelatin and glyoxal containing from about 2.5 to about 7% by weight glyoxal based on the weight of the gelatin, said copolymer having a water soluble fraction in the range of from about 30 to about 80%.

4. A substantially dry pharmaceutical vehicle suitable for oral administration comprising a copolymer of hydrolyzed gelatin and glyoxal containing from about 4 to about 5% by weight glyoxal based on the weight of the gelatin, said copolymer having a water soluble fraction in the range of from about 30 to about 80%.

5. A substantially dry pharmaceutical vehicle suitable for oral administration comprising a copolymer of hydrolyzed gelatin and glyoxal containing from about 2.5 to about 7% by weight glyoxal based on the weight of the gelatin, said copolymer having a water soluble fraction in the range of from about 40 to about 70%.

6. A substantially dry pharmaceutical vehicle suitable for oral administration comprising a copolymer of hydrolyzed gelatin and glyoxal containing from about 4 to about 5% by weight glyoxal based on the weight of the gelatin, said copolymer having a water soluble fraction in the range of from about 40 to about 70%.

7. A process for the preparation of a pharmaceutical vehicle suitable for oral administration which comprises polymerizing hydrolyzed gelatin with from about 2.5 to about 7% by weight glyoxal based on the weight of gelatin.

8. A process for the preparation of a pharmaceutical vehicle suitable for oral administration which comprises hydrolyzing a gelatin solution having an acid to neutral pH, neutralizing the hydrolyzed gelatin solution, adding from about 2.5 to about 7% by weight glyoxal based on the weight of gelatin, polymerizing and drying the resulting copolymer.

9. A process for the preparation of a pharmaceutical vehicle suitable for oral administration which comprises hydrolyzing a gelatin solution having an acid to neutral pH, neutralizing the hydrolyzed gelatin solution, adding from about 4 to about 5% by weight glyoxal based on the weight of gelatin, polymerizing and drying the resulting copolymer.

10. In a process for the preparation of a pharmaceutical vehicle suitable for oral administration, the steps which comprise heating a gelatin solution having an acid to neutral pH at a temperature of about 95 to 125° C. until the solution attains a viscosity of about 10 to 14 centipoises measured at 50° C., neutralizing the hydrolyzed gelatin solution, cooling said solution to about 40 to 50° C., adding from about 2.5 to about 7% by weight glyoxal based on the weight of gelatin, polymerizing for about 10 to 60 minutes, and drying the resulting copolymer.

11. In a process for the preparation of a pharmaceutical vehicle suitable for oral administration, the steps which comprise acidifying a substantially 20% by weight gelatin solution to a pH of about 4, heating said solution to about 110° C. for about 2 hours until a solution viscosity of about 10–14 centipoises measured at 50° C. is obtained, neutralizing the gelatin solution thus degraded, adding the glyoxal solution in an amount of about 5% by weight of glyoxal based on the weight of gelatin, polymerizing for about 10 minutes, drying the resulting copolymer, and milling the dry copolymer finer than about 80 mesh.

12. A solid pharmaceutical preparation suitable for oral administration comprising in intimate admixture a solid medicament and a copolymer of hydrolyzed gelatin and glyoxal containing from about 2.5 to about 7% by weight glyoxal based on the weight of gelatin.

13. A solid pharmaceutical preparation suitable for oral administration comprising in intimate admixture a solid medicament and a copolymer of hydrolyzed gelatin and glyoxal containing from about 2.5 to about 7% by weight glyoxal based on the weight of gelatin, said preparation containing at least 50% by weight of said copolymer.

14. A tablet suitable for oral administration comprising in intimate admixture a solid medicament and a copolymer of hydrolyzed gelatin and glyoxal containing from about 2.5 to about 7% by weight glyoxal based on the weight of gelatin, said tablet having a hardness of at least 10 kg.

15. A tablet suitable for oral administration comprising in intimate admixture a solid medicament and a copolymer of hydrolyzed gelatin and glyoxal containing from about 2.5 to about 7% by weight glyoxal based on the weight of gelatin, said tablet having a hardness of at least 10 kg. and containing at least 50% by weight of said copolymer.

16. A tablet having a hardness of at least 10 kg. and suitable for oral administration comprising in intimate admixture a solid medicament and a copolymer of hydrolyzed gelatin and glyoxal containing from about 2.5 to about 7% by weight glyoxal based on the weight of gelatin, said tablet containing at least 50% by weight of said copolymer and being capable of providing a sustained release of said medicament in the gastro-intestinal tract over an extended period of time.

References Cited in the file of this patent
UNITED STATES PATENTS
2,591,133     Campbell et al.            Apr. 1, 1952